(12) United States Patent
Zoidis et al.

(10) Patent No.: US 7,021,774 B2
(45) Date of Patent: Apr. 4, 2006

(54) PROJECTOR ARRANGEMENT

(75) Inventors: Evangelos Zoidis, Waiblingen (DE); Frederic Ludley, Stuttgart (DE)

(73) Assignee: SONY International (Europe) GmbH, Berlin (DE)

( * ) Notice: Subject to any disclaimer, the term of this patent is extended or adjusted under 35 U.S.C. 154(b) by 0 days.

(21) Appl. No.: 10/732,770

(22) Filed: Dec. 9, 2003

(65) Prior Publication Data

US 2004/0165158 A1 Aug. 26, 2004

(30) Foreign Application Priority Data

Dec. 13, 2002 (EP) .................................. 02027966

(51) Int. Cl.
*G03B 21/00* (2006.01)
*G03B 21/14* (2006.01)
*G02F 1/1333* (2006.01)

(52) U.S. Cl. .................... 353/119; 353/122; 349/58

(58) Field of Classification Search ........... 359/561, 359/277, 256, 5; 348/789; 349/6, 9, 58; 353/DIG. 4, 87, 122, 119, 20, 27, 31, 33, 353/34, 61, 66, 74, 81
See application file for complete search history.

(56) References Cited

U.S. PATENT DOCUMENTS

| 4,313,665 A | * | 2/1982 | Spitz ......................... 353/122 |
| 4,621,782 A | | 11/1986 | Carlson et al. .......... 248/183.3 |
| 4,653,709 A | | 3/1987 | Paldino .................... 248/183.2 |
| 4,934,647 A | | 6/1990 | Edwards .................... 248/371 |
| 5,029,795 A | | 7/1991 | Dexter ....................... 248/431 |

FOREIGN PATENT DOCUMENTS

GB 2355080 A * 4/2001

OTHER PUBLICATIONS

Patent Abstracts of Japan, vol. 2003, No. 2, Feb. 5, 2003, Publication No. JP 2002-296670.

* cited by examiner

*Primary Examiner*—W. B. Perkey
*Assistant Examiner*—Rochelle Blackman
(74) *Attorney, Agent, or Firm*—Oblon, Spivak, McClelland, Maier & Neustadt, P.C.

(57) ABSTRACT

The invention provides a projector arrangement (1) in which an objective cover unit (6) for covering a light exit portion or surface (4e) of an objective unit (4) is adapted to serve as a support or bearing (8) for a projector unit (3) of a projector arrangement (1) in an operation mode. Additionally or alternatively, said projector arrangement (1) comprises a surface region (2a) to be rested on in an operation or projection mode, so as to realize distinct positions and/or orientations for the projection.

20 Claims, 3 Drawing Sheets

PROJECTOR ARRANGEMENT

The present invention relates to a projector arrangement according to the preamble of independent claim 1 and alternatively according to the preamble of independent claim 4.

Projectors and projector arrangements for projecting images on an external screen become more and more popular. For instance, so-called beamers or beamer arrangements are used to project images produces within a portable personal computer, e.g. a laptop or notebook, to a large audience within lectures, teaching courses of the like. In known apparatuses for projecting images a projector unit is provided having an objective unit for optically projecting images, in particular on an external screen. For protecting the objective unit it is known to provide an objective cover unit for covering a light exit portion or light exit surface of said objective unit against mechanical impacts, dust and dirt, in particular within a standby, pause, non-projecting and/or non-operation mode of said projector arrangement.

In general there are additionally means necessary and provided for supporting the projector arrangement during operation and the process of projection on an operation surface, such as a table or the like. Therefore, there are different components and separate elements necessary and needed in known projectors and projector arrangements for realizing on the one hand a protection for the objective unit and on the other hand for supporting and bearing the projector arrangement during its use on an external working or operation surface.

It is an object of the present invention to provide a projector arrangement which which can be stably supported on an external working or operation surface involving a limited or reduced number of components, and in particular which can be at the same time be protected in a reliable manner.

The object is achieved in a projector arrangement according to the generic part of independent claim 1 and as described above according to the invention with the characterizing features of independent claim 1. Alternatively, the object is achieved in a projector arrangement according to the generic part of independent claim 4 and as described above according to the invention with the characterizing features of independent claim 4. Preferred embodiments of the inventive projector arrangement are within the scope of the dependent sub-claims.

According to a first solution of the object, the projector arrangement according to the present invention is characterized in that said objective cover unit is adapted to serve and/or to function as a support or bearing unit for supporting said projector unit, in particular on an external operation surface and/or in particular in an operation mode of said projector arrangement.

It is therefore a basic idea of the present invention according to the first solution to provide a objective cover unit with two functionalities. According to the first functionality said objective cover unit is adapted for covering a light exit portion of said objective unit in a non-projecting mode of the projector arrangement, such as a standby mode or a pause mode. According to the invention the second functionality of the objective cover unit is to serve as a support or bearing unit, i.e. to support and bear the projector unit during an operation mode or projecting mode of the projector arrangement. Therefore, according to the present invention, explicit and separate supporting and bearing means are obsolete, as the protecting functionality for the light exit portion of the objective unit can be realized by the objective cover unit during the non-projecting mode and as the objective cover unit can be used as a support and bearing unit in a projecting mode, where the protecting functionality of the objective cover unit is not needed.

According to a preferred embodiment of the present inventive projector arrangement, said objective cover unit and/or the projector unit are formed and/or adapted to allow a plurality of locations and/or portions of or on said projector unit to be rested on said objective cover unit when said projector unit is supported by said objective cover unit as said support or bearing unit in said operation mode of said objector arrangement. According to that particular measure a plurality of locations and/or portions on said projector unit is provided allowing a respective and according plurality of projecting situations, for instance a plurality of horizontal and/or vertical inclination angles or projecting angles.

Additionally or alternatively, each of said locations and/or portions of or on said projector unit is chosen to be assigned to and/or to realize distinct orientations and/or positions of said projector arrangement in an particular of its objective unit when said projector unit is supported by said objective cover unit as said support or bearing unit in said operation mode for said projector arrangement.

According to the alternative second solution of the object, the projector arrangement according to the present invention comprises a projector unit having an objective unit for optically projecting images, in particular on an external screen and is characterized in that a surface region is provided having a plurality of locations and/or portions being adapted for directly or indirectly resting on, in particular an external operation or working surface, in an operation mode or projecting mode of said projector arrangement and further in that each of said locations and/or portions of or on said projector unit are chosen to be assigned to and/or to realize a distinct position and/or orientation of said projector arrangement and in particular of its objective unit in said operation mode or projecting mode of said projector arrangement.

It is therefore a basic idea of the second solution to provide said projector arrangement and in particular said projector unit thereof with a surface region for resting on said projector arrangement in a plurality of portions and/or location, thereby ensuring a variety of projection orientations and/or positions in a convenient manner and without the need of further equipment.

According to a preferred embodiment of the second solution fixing means is/are provided for detachably fixing said projector arrangement and in particular said projector unit in each of said locations and/or portions and in particular in each of said distinct positions and/or orientations, when resting in or on a respective location and/or portion.

The projector arrangement according to the second solution preferably comprises an objective cover unit for covering a light exit portion or light exit surface (4e) of said objective unit in a standby, pause, non-projecting mode and/or non-operation mode of said projector arrangement, wherein that said objective cover unit is adapted to serve and/or to function as a support or bearing unit for supporting said projector unit and/or as said fixing means, in particular on an external operation surface, in an operation mode of said projector arrangement.

According to a preferred advantageous embodiment of the inventive projector arrangement each of said locations and/or portions of or on said projector unit is chosen to be assigned to and/or to realize distinct—vertical and/or horizontal—projection angles or inclination angles of said projector arrangement and in particular of its objective unit when said projector unit is supported by said objective cover unit as said support or bearing unit in said operation mode or said projector arrangement, in particular with respect to a horizontal plane of an external operating surface and/or in particular with respect to said external screen.

Additionally or alternatively, it is preferred that said objective unit and/or said projector unit are formed and/or adapted to provide a continuously distributed plurality of said locations/portions, positions/orientations and/or projection angles or inclination angles. According to this particular measure a particular large variety of different projection situations in the sense of projecting angles or inclination angles can be realized so as to enable a particular convenient use and application of the inventive projector arrangement.

It is further preferred that said projector unit comprises a base portion having a surface, in particular as said surface region of said projector arrangement or said projector unit, at least a part of which being continuously and/or smoothly curved in an at least local convex manner, in particular to realize said plurality of said locations/portions, positions/ orientations and/or projection angles or inclination angles, in particular on its surface, and/or in particular so as to enable in said operation mode a resting or supporting of said projection unit on said support or bearing unit.

In this case it is further preferred that said base portion has at least in part—when cross sectionally viewed—an at least partly circular elliptical and/or parabolic shape.

Further, it is preferred that said base portion have at least in part a spherical, ellipsoidal, paraboloidal, and/or cylindrical shape.

It is of particular advantage to provide a base portion, which is essentially formed as a hemisphere and/or as a hemi-cylinder or as a part thereof.

According to a further alternative of the present invention said objective cover unit may be formed as a detachable cap for said objective unit. This ensures a particular convenient usage of the objective cover unit, as a cap may be moved around and fixed and detached from the objective unit in an easy and reliable manner.

The objective cover unit—in particular in the form of a detachable cap—may be realized in a plurality of geometrical and mechanical shapes.

For instance, it is possible that said objective cover unit comprises a first or inner base surface which is adapted to face said light exit portion or light exit surface of said objective unit in said standby, pause, non-projecting and/or non-operation mode and to face the projector unit and in particular a portion of its base portion in said operation mode of said projector arrangement. In this case, additionally, a second or outer base surface is provided, which is situated opposite to said first or inner base surface and therefore situated opposite from said light exit portion or light exit surface of said objective unit in said standby, pause, non-projecting and/or non-operation mode and opposite said base portion and/or the surface thereof in said operation or projecting mode and which is adapted to face and to rest on said external operation surface in said operation mode of said inventive projector arrangement.

In this case, additionally said objective cover unit comprises a rim portion, in particular provided on the periphery of said first or inner base surface, and projecting away from said first or inner base surface, in particular essentially in the direction of the inner base surface's normal, thereby forming abutment surfaces adapted to support, to bear or to have rested on the projector unit and in particular said base portion thereof in said operation mode of said inventive projector arrangement.

It is of further advantage, if said objective cover unit as said support or bearing unit and in particular its rim portion and/or abutment surfaces and/or said projector unit and in particular its base portion are formed and adapted to realized one or an arbitrary combination or plurality of the following aspects of cooperating and/or engaging of respective shapes and/or surfaces, of providing frictional interacting forces with respect to each other, and/or of having a stable and/or equilibrated supporting.

To achieve a stable projecting situation it is preferred that said projector unit and in particular its base portion has a shaped and/or a mass distribution so as to ensure to be supported by said support or bearing unit in a loss or gravitational equilibrium.

According to a further alternative, said objective cover unit and in particular its rim portion comprise position holding or fixing means or elements for ensuring an essentially fixed positioning of the supported and rested projector unit in said operation mode.

These and further aspects made be further elucidated taking into account the following remarks:

The shape of a projector may be of half-circular form or semispherical form. For different fields of applications the height of projection can be individually changed. A special character of this projector is that the objective cover is used for the fixing of the projecting angle or projection angle. Also moving the cover along a groove axis the projector stands as a certain position and therefore allows to easily be adjusted to the light vertical projecting angle up to 90°.

The special circular shape ensures the height adjustment that can be dynamically changed by remode control. Vertical adjustment capability can be extended of a maximum to ±45°. On the other hand the objective may be protected with the cover in the off-mode or non-projection mode. In the working mode or projection mode the cover is used for fixing the projection angle of the projector. This angle can vary for instance between 0° and 35°.

The moving of the objective cover may be done with position holders for instance, at the edge of the objective. As an alternative the projector and its base portion may be designed as a sphere and therefore it may offer the possibility to adjust a vertical projection angle of 90° and also of 360° as a horizontal projection angle.

In the following the present invention will become elucidated on the basis of a preferred embodiment taking into account the accompanying Figures.

In the following, elements and components having a comparable structure and/or similar functionalities are indicated by the same reference symbols. A detailed description of these elements is not repeated in each case of their occurrence.

Figure 1:
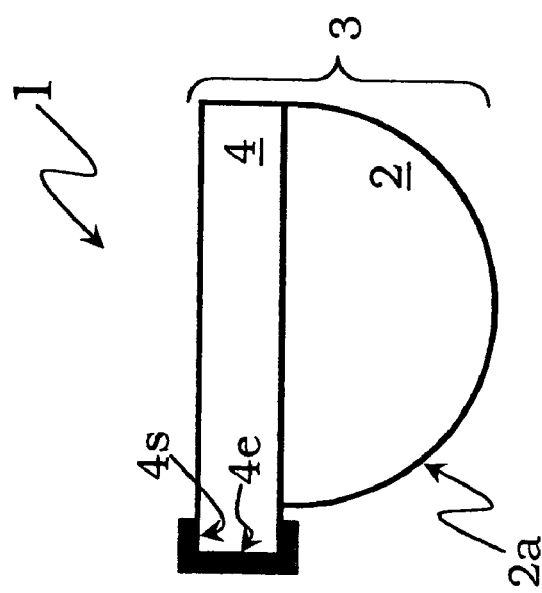
FIG. 1 is a cross-sectional side view of an embodiment of the inventive projector arrangement in a non-operation mode.

FIG. 1 is a cross-sectional side view of an embodiment of the inventive projector arrangement 1 in a non-operation or non-projecting mode. The projector arrangement 1 is build up by a projector unit 3 comprising an objective unit 4 and a base portion 2. The objective unit 4 comprises a light output portion 4*e* or light output surface 4*e* which is covered in the situation shown in FIG. 1 by a objective cover unit 6.

Therefore, the objective cover unit 6 surrounds and is attached to side areas 4s of said objective unit 4 in the vicinity of said light output portion 4e or said light output surface 4e. The base portion 2 is in the case of FIG. 1 of hemispherical or cylindrical shape so that the cross-section of said base portion 2 has a almost half-circular shape. The base portion 2 and therefore the complete projector unit 3 rest in an operation mode or a projecting mode on the base portion's surface area 2a.

Figure 2:
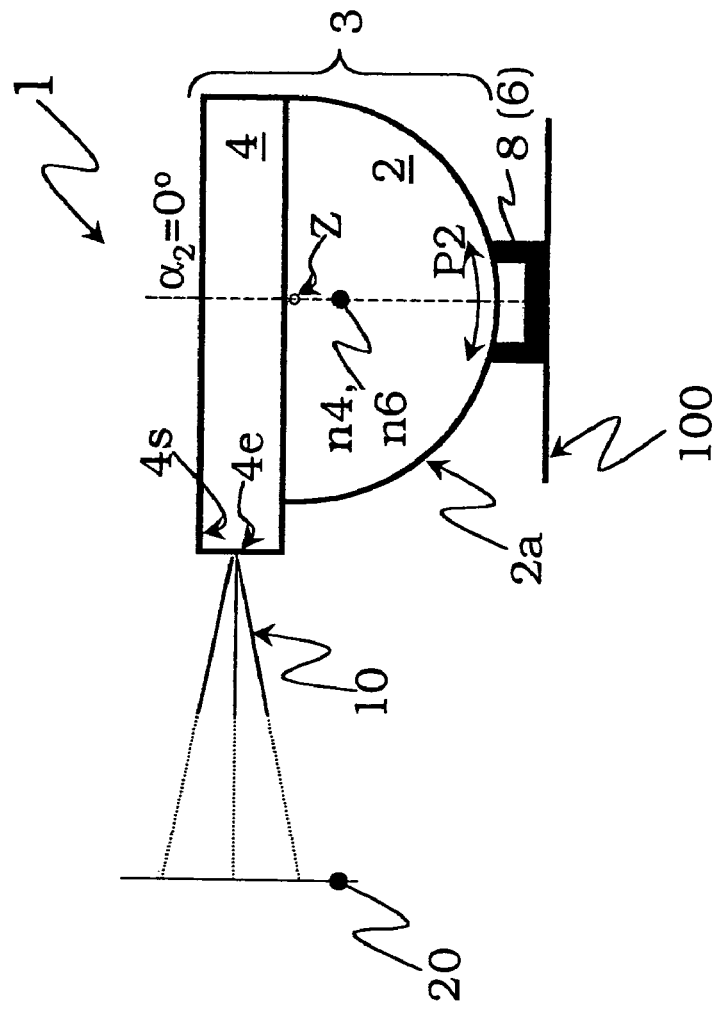
FIG. 2-4 are cross-sectional side views of the embodiment of FIG. 1 in an operation mode with three different projecting angles.

In the situation shown in FIG. 2 the objective cover unit 6 has been removed so as to be positioned with its outer base surface 6b or second base surface 6b on an external operating surface 100. Therefore, said objective cover unit 6 serves and functions as a supporting and bearing unit 8 for said projector unit 3. In this situation the base portion 2 of the projector unit 3 rests with a part P2 of its surface 2a on rim portions 6r of the objective cover unit 6 to be described below. In the situation shown in FIG. 2 the projector unit 3 and therefore its objective unit 4 are oriented and positioned horizontally, so that the inclination angle $\alpha_2$ between the axis n6 of the objective cover unit 6 as said supporting and bearing unit 8 and the axis n4 of the objective unit 4 is 0°. Therefore, the image to be projected on the external screen 20 by rays 10 is also produced under a projection angle or inclination angle of 0°. As already mentioned, to achieve the horizontal positioning the base portion 2 is supported on the supporting or bearing unit 8 in the form of said objective cover unit 6 with its location or portion P2 indicated by the curved arrow in FIG. 2.

In FIG. 2 also the pivotal point Z or rotational point Z is indicated about which the base portion 2 and therefore the complete projector unit 3 can be rotated.

By rotating the complete projector unit 3 about the aforementioned pivotal point Z an inclination angle $\alpha_3$ of about 20° between the axis n4 of the objective unit 4 and n6 of the objective cover unit 6 can be achieved. Consequently, an inclination angle differing from 0° with respect to the projecting raise 10 is obtained. This is done by resting and supporting the base portion 2 of the projector unit 2 with its location or portion P3 indicated by the respective curved arrow.

Figure 4:
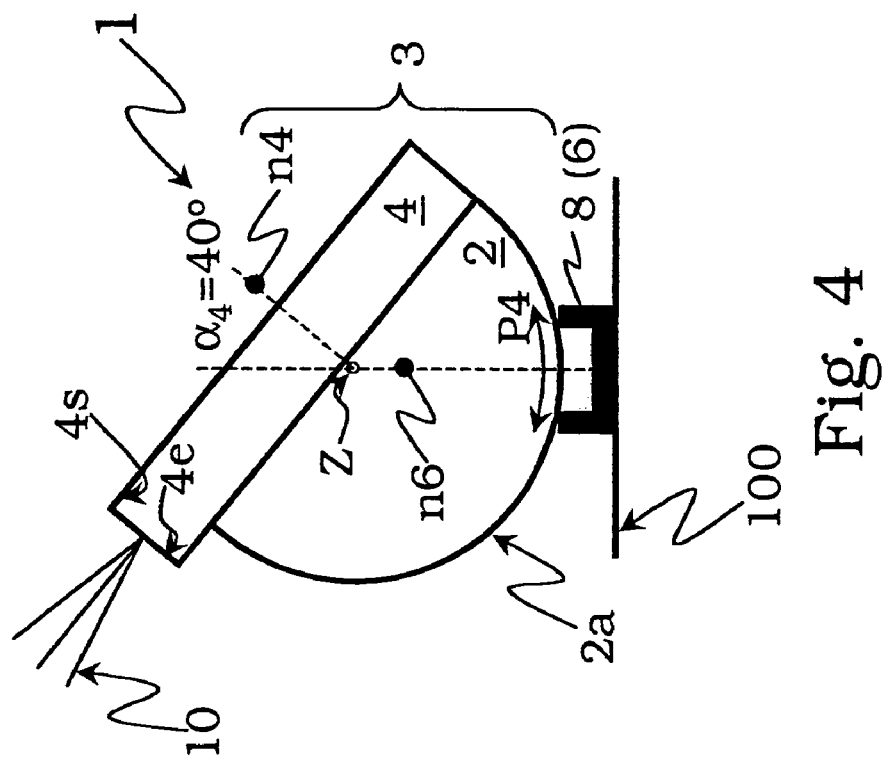

FIG. 4 demonstrates a further increased inclination between the axis n4 of the objective unit 4 and n6 of the objective cover unit 6 as said supporting or bearing unit 8. Here an inclination $\alpha_4$ of about 40° is achieved by positioning the base portion with its location or portion P4 on said objective cover unit 6 as said supporting or bearing unit 8.

Figure 3:
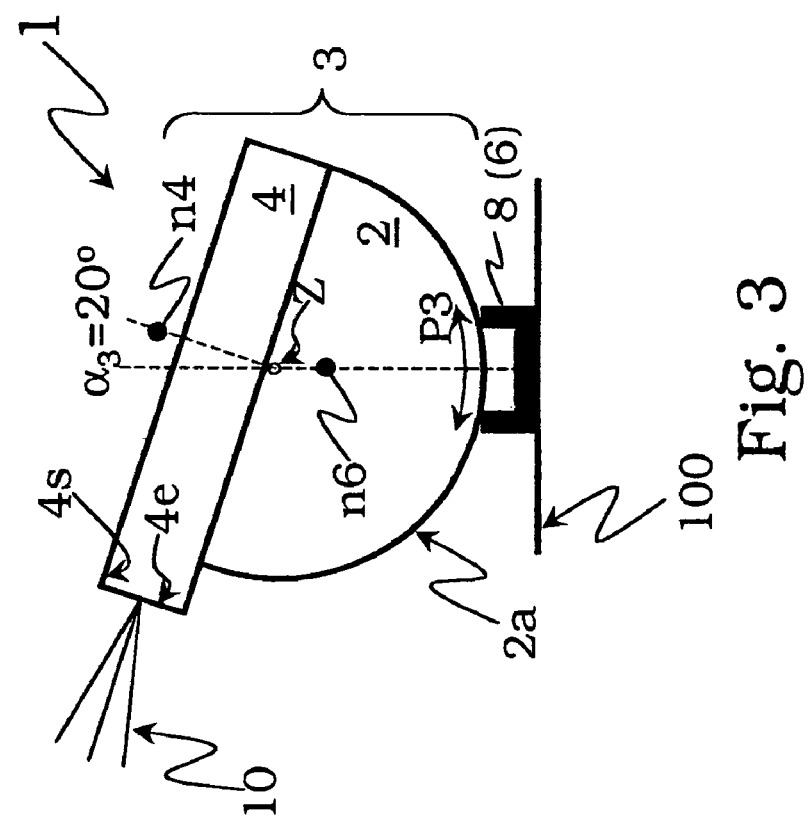
Figure 5:
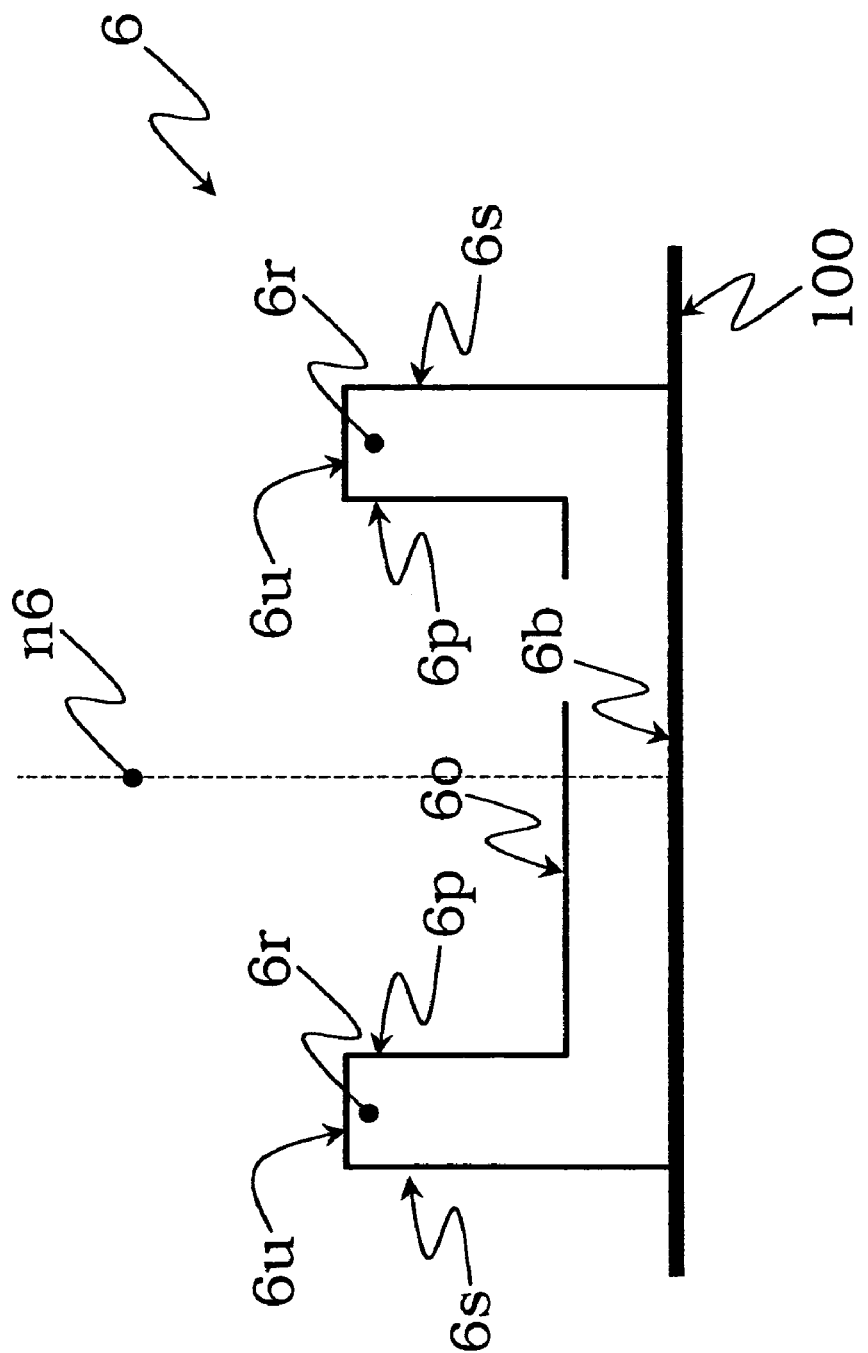
FIG. 5 is a cross-sectional side view of an objective cover unit that can be employed in the inventive projector arrangement.

FIG. 5 is a cross-sectional side view of the objective cover unit 6 as said supporting or bearing unit 8. The objective cover unit 6 consists of a first or inner base surface 6o and a second or outer base surface 6b opposite to said first or inner base surface 6o. In the non-operation mode or non-projecting mode shown in FIG. 1 said first or inner base surface 6o of said objective cover unit 6 is closely adjacent to said light exit portion 4e or light exit surface 4e of the objective unit 4 wherein said rim portion 6r of said objective cover unit 6 is then situated with its inner surface 6s in mechanical contact with the respective surface portion 4s of the objective unit 4 which are located in the vicinity of said light exit portion 4e or said light exit surface 4e. In the projecting mode or operation mode the objective cover unit 6 is used as a supporting or bearing unit 8 by placing said objective cover unit 6 with its second base surface 6b onto an external working or operation surface 100 as is shown in the sequence of FIG. 2 to 4. In this case, the rim 6r extends from the first or inner base surface 6o away, in particular in essentially vertical manner which can be described by the direction of the axis n6 shown in FIG. 2 to 4. In accordance to its lateral extension the rim 6r possesses abutment surfaces 6u, onto which the distinct surface portions P2, P3, or P4, respectively, can be rested on so as to realize different projection angles or inclination angles for said objective unit 4 with respect to said external screen 20.

LIST OF REFERENCE SYMBOLS 1 projector arrangement according to the present invention
2 base portion
2a surface, surface region
3 projector unit
4 objective unit
4e light exit portion, light exit surface
6 objective cover unit, cap, objective cap
6b second base surface, outer base surface
6o first base surface, inner base surface
6p outer peripheral surface
6r rim, rim portion
6s inner peripheral surface
6u abutment surface
8 supporting unit, bearing unit, fixing means
10 projecting ray, projecting beam, ray of light
20 external screen
100 external operating surface, external working surface
n4 axis of objective unit
n6 axis of objective cover unit, axis of supporting and bearing unit
P2 surface portion, portion, location, position
P3 surface portion, portion, location, position
P4 surface portion, portion, location, position
Z pivotal point, rotational point
$\alpha_2$ inclination angle, projection angle
$\alpha_3$ inclination angle, projection angle
$\alpha_4$ inclination angle, projection angle

What is claimed is:

1. A Projector arrangement, comprising:
    a projector unit, having an objective unit for optically projecting images on to an external screen; and
    an objective cover unit for covering a light exit portion or light exit surface of said objective unit in a standby, pause, non-projecting mode and/or non-operation mode of said projector arrangement,
    wherein said objective cover unit is adapted to serve and/or to function as a support unit for supporting said projector unit on an external operation surface, in an operation mode of said projector arrangement, and
    wherein said projector unit comprises a base portion having a surface region of said projector unit, at least a part of which being continuously and/or smoothly curved in an at least a local convex manner, so as to realize said plurality of said locations/portions, positions/orientations and/or projection angles or inclination angles, on its surface, and/or so as to enable in said operation mode of said projector arrangement a resting or supporting of said projector unit on said support unit.

2. The Projector arrangement according to claim 1,
    wherein said objective cover unit and/or said projector unit are formed and/or are adapted to allow a plurality of locations and/or portions of or on said projector unit to be rested on said objective cover unit when said projector unit is supported by said objective cover unit as said support or bearing unit in said operation mode of said projector arrangement.

3. The Projector arrangement according to claim 2,
wherein each of said locations and/or portions of or on said projector unit are chosen to be assigned to and/or to realize a distinct position and/or orientation of said objective unit when said projector unit is supported by said objective cover unit as said support or bearing unit in said operation mode of said projector arrangement.

4. The Projector arrangement according to claim 2,
wherein each of said locations and/or portions of or on said projector unit are chosen to be assigned to and/or to realize distinct—vertical and/or horizontal—projection angles or inclination angles of said projector arrangement and said objective unit when said projector unit is supported by said objective cover unit as said support or bearing unit in said operation mode of said projector arrangement and/or with respect to a horizontal plane of an external operating surface and/or with respect to said external screen.

5. The Projector arrangement according to claim 2,
wherein said objective cover unit and/or said projector unit are formed and/or are adapted to provide a continuously distributed plurality of said locations/portions, positions/orientations and/or projection angles or inclination angles.

6. The Projector arrangement according to claim 1,
wherein said base portion has at least in part—when cross sectionally viewed—an at least partial circular, elliptical, and/or parabolic shape.

7. The Projector arrangement according to claim 1,
wherein said base portion has at least in part a spherical, ellipsoidal, paraboloidal and/or cylindrical shape.

8. The Projector arrangement according to claim 1,
wherein said base portion is essentially formed as a hemisphere or hemi-cylinder or as a part thereof.

9. The Projector arrangement according to claim 1,
wherein said objective cover unit is formed as a detachable cap for said objective unit.

10. The Projector arrangement according to claim 1,
wherein said objective cover unit comprises:
a first or inner base surface adapted to face said light exit portion or light exit surface of said objective unit in said standby, pause, non-projecting and/or non-operating mode and to face a surface of said base portion in said operation mode of said projector arrangement, and
a second or outer base surface situated opposite said first or inner base surface and therefore situated opposite from said light exit portion or said light exit surface of said objective unit in said standby, pause, non-projecting, and/or non-operating mode and opposite said base portion and/or said surface thereof in said operation mode and which is adapted to face and rest on said external operating surface in said operation mode.

11. The Projector arrangement according to claim 10,
wherein said objective cover unit comprises a rim portion provided on the periphery of said first or inner base surface and projecting away from said first or inner base surface essentially in the direction of the inner base surface's normal, thereby forming abutment surfaces adapted to support or to have rested on a surface of said base portion in said operation mode of said projector arrangement.

12. The Projector arrangement according to claim 1,
wherein a rim portion of said objective cover unit as said support or bearing unit and/or said abutment surfaces and/or a base portion of said projector unit are formed and adapted to realize one or an arbitrary combination or plurality of the following aspects:
cooperation and/or engaging of respective shapes and/or surfaces,
frictional interaction forces between each other,
stable and/or equilibrated support of said projector unit.

13. The Projector arrangement according to claim 1,
wherein a base portion of said projector unit have a shape and/or a mass distribution so as to ensure to be supported by said support or bearing unit in mass or gravitational equilibrium.

14. The Projector arrangement according to claim 1,
wherein a rim portion of said objective cover unit comprise position holding or fixing elements for ensuring an essentially fixed positioning of the supported and rested projector unit in said operation mode.

15. A Projector arrangement, comprising:
a projector unit having an objective unit for optically projecting images on to an external screen,
wherein a surface region is provided having a plurality of locations and/or portions being adapted for directly or indirectly resting on, an external operation or working surface, in an operation mode or projecting mode of said projector arrangement, and
wherein each of said locations and/or portions of or on said projector unit are chosen to be assigned to and/or to realize a distinct position and/or orientation of said objective unit in said operation mode or projecting mode of said projector arrangement, and
wherein said projector unit comprises a base portion having a surface region of said projector unit, at least a part of which being continuously and/or smoothly curved in an at least local convex manner so as to realize said plurality of said locations/portions, positions/orientations and/or projection angles or inclination angles on its surface, and/or so as to enable in said operation mode of said projector arrangement a resting or supporting of said projector unit; and
an objective cover unit for covering a light exit portion or light exit surface of said objective unit in a standby, pause, non-projecting mode and/or non-operation mode of said projector arrangement,
wherein said objective cover unit is adapted to serve and/or to function as a support or bearing unit for supporting said projector unit and/or as a fixing means on an external operation surface, in an operation mode of said projector arrangement.

16. A Projector arrangement, comprising:
a projector unit having an objective unit for optically projecting images on to an external screen,
wherein a surface region is provided having a plurality of locations and/or portions being adapted for directly or indirectly resting on, an external operation or working surface, in an operation mode or projecting mode of said projector arrangement,
wherein each of said locations and/or portions of or on said projector unit are chosen to be assigned to and/or to realize a distinct position and/or orientation of said objective unit in said operation mode or projecting mode of said projector arrangement,
wherein said projector unit comprises a base portion having a surface, in particular as said surface region of said projector unit, at least a part of which being continuously and/or smoothly curved in an at least local convex manner, in particular so as to realize said plurality of said locations/portions, positions/orientations and/or projection angles or inclination angles, in particular on its surface, and/or in particular so as to enable in said operation mode of said projector arrangement a resting or supporting of said projector unit, and
wherein each of said locations and/or portions of or on said projector unit are chosen to be assigned to and/or to realize distinct—vertical and/or horizontal—projection angles or inclination angles of said projector arrangement and of its objective unit when said projector unit is supported by said objective cover unit as a support or bearing unit in said operation mode of said projector arrangement and/or with respect to a horizontal plane of an external operating surface and/or with respect to said external screen.

17. A Projector arrangement, comprising:

a projector unit having an objective unit for optically projecting images on to an external screen, wherein a surface region is provided having a plurality of locations and/or portions being adapted for directly or indirectly resting on, an external operation or working surface, in an operation mode or projecting mode of said projector arrangement, wherein each of said locations and/or portions of or on said projector unit are chosen to be assigned to and/or to realize a distinct position and/or orientation of said objective unit in said operation mode or projecting mode of said projector arrangement, wherein said projector unit comprises a base portion having a surface, in particular as said surface region of said projector unit, at least a part of which being continuously and/or smoothly curved in an at least local convex manner, in particular so as to realize said plurality of said locations/portions, positions/orientations and/or projection angles or inclination angles, in particular on its surface, and/or in particular so as to enable in said operation mode of said projector arrangement a resting or supporting of said projector unit, and wherein an objective cover unit is formed as a detachable cap for said objective unit.

18. A Projector arrangement, comprising:

a projector unit having an objective unit for optically projecting images on to an external screen, wherein a surface region is provided having a plurality of locations and/or portions being adapted for directly or indirectly resting on, an external operation or working surface, in an operation mode or projecting mode of said projector arrangement, wherein each of said locations and/or portions of or on said projector unit are chosen to be assigned to and/or to realize a distinct position and/or orientation of said objective unit in said operation mode or projecting mode of said projector arrangement, wherein said projector unit comprises a base portion having a surface, in particular as said surface region of said projector unit, at least a part of which being continuously and/or smoothly curved in an at least local convex manner, in particular so as to realize said plurality of said locations/portions, positions/orientations and/or projection angles or inclination angles, in particular on its surface, and/or in particular so as to enable in said operation mode of said projector arrangement a resting or supporting of said projector unit, and wherein an objective cover unit is provided comprising:

a first or inner base surface adapted to face said light exit portion or light exit surface of said objective unit in said standby, pause, non-projecting and/or non-operating mode and to face said projector unit and said base portion in said operation mode of said projector arrangement, and a second or outer base surface situated opposite said first or inner base surface and therefore situated opposite from said light exit portion or said light exit surface of said objective unit in said standby, pause, non-projecting, and/or non-operating mode and opposite said base portion and/or said surface thereof in said operation mode and which is adapted to face and rest on said external operating surface in said operation mode.

19. A projector arrangement, comprising:

a projector unit having an objective unit for optically projecting images on to an external screen, wherein a surface region is provided having a plurality of locations and/or portions being adapted for directly or indirectly resting on, an external operation or working surface, in an operation mode or projecting mode of said projector arrangement, wherein each of said locations and/or portions of or on said projector unit are chosen to be assigned to and/or to realize a distinct position and/or orientation of said objective unit in said operation mode or projecting mode of said projector arrangement, wherein said projector unit comprises a base portion having a surface, in particular as said surface region of said projector unit, at least a part of which being continuously and/or smoothly curved in an at least local convex manner, in particular so as to realize said plurality of said locations/portions, positions/orientations and/or projection angles or inclination angles, in particular on its surface, and/or in particular so as to enable in said operation mode of said projector arrangement a resting or supporting of said projector unit, and wherein an objective cover unit is provided as a support or bearing unit having a rim portion and/or abutment surfaces which are together with said projector unit and its base portion formed and adapted to realized one or an arbitrary combination or plurality of the following aspects:

cooperation and/or engaging of respective shapes and/or surfaces, frictional interaction forces between each other, stable and/or equilibrated support of said projector unit.

20. A Projector arrangement, comprising:

a projector unit having an objective unit for optically projecting images on to an external screen, wherein a surface region is provided having a plurality of locations and/or portions being adapted for directly or indirectly resting on, an external operation or working surface, in an operation mode or projecting mode of said projector arrangement, wherein each of said locations and/or portions of or on said projector unit are chosen to be assigned to and/or to realize a distinct position and/or orientation of said objective unit in said operation mode or projecting mode of said projector arrangement, wherein said projector unit comprises a base portion having a surface, in particular as said surface region of said projector unit, at least a part of which being continuously and/or smoothly curved in an at least local convex manner, in particular so as to realize said plurality of said locations/portions, positions/orientations and/or projection angles or inclination angles, in particular on its surface, and/or in particular so as to enable in said operation mode of said projector arrangement a resting or supporting of said projector unit, and wherein an objective cover unit having a rim portion is provided which comprises position holding or fixing elements for ensuring an essentially fixed positioning of the supported and rested projector unit in said operation mode.

* * * * *